FIG. I

INVENTOR.
ARMIN BLUMER

3,350,746
APPARATUS FOR MOUNTING AN INJECTION MOLD FOR ANGULAR MOVEMENT
Armin Blumer, Schwanden, Switzerland, assignor to Maschinenfabrik und Giesserei Netstal AG, Netstal, Switzerland
Filed Sept. 1, 1964, Ser. No. 393,525
Claims priority, application Switzerland, Sept. 3, 1963, 10,915/63
12 Claims. (Cl. 18—30)

This invention relates to injection molding apparatus of the type comprising a heating and injection unit supported on a machine frame and a molding unit adjustable with respect to the axis of the heating and injection unit. More particularly, the present invention is directed to an improved and simplified injection molding apparatus in which relative adjustability of the molding unit and the heating and injection unit, with several degrees of freedom of relative adjustability, is provided in a simplified and inexpensive manner.

In a known injection molding apparatus of the mentioned type involving an injection unit and a molding unit adjustably supported on a machine frame, both the injection unit and the molding unit are postionable on the machine frame with their axes in various relative angular positions in a vertical plane of the machine frame. It is thus possible, for example, with the axis of the injection unit extending horizontally, to arrange the molding unit to extend either horizontally or vertically. With the two units aligned either horizontally or vertically, molded members may be produced with a material feed head or injection nozzle positioned centrally of the mold while, with the two units arranged with their axes at 90° to each other, molded members may be produced with the injection nozzle located in the mold dividing or parting plane. Furthermore, a machine of this type is suitable for molding members using deposited plastic material and, in such case, the molding unit is arranged with its axis extending vertically.

While a machine of the type just described thus allows for different relative adjustments of its units to accommodate various injection conditions, it is, however, complicated in construction and operation. The movement or change of one or both units from one position to another necessitates a dismantling, and re-assembling is relatively complicated and time-consuming. Since the distribution of the centers of gravity of the two units varies with different relative positions thereof and, especially with injection units arranged to extend upright or in a vertical position, is unfavorable, extremely stable bearing and supporting elements must be provided. The adjustment of the heating and injection unit furthermore requires a relatively complicated arrangement of the controlling means therefor or of hydraulic conduits connected to this unit.

In accordance with the present invention an injection molding machine comprising a combination of a heating and injection unit and a molding unit is provided in which the disadvantages mentioned above either are obviated or reduced to a minimum. To attain this, the invention machine, which is designed for injection molding of members from plastic materials, comprises a heating and injection unit supported on a machine frame, and a molding unit adjustable with respect to the axis of the injection unit. More particularly, the molding unit is mounted on the machine frame for adjustment in a plane perpendicular to the horizontal axis of the injection unit, as well as being adjustable in an axial direction and angularly around the axis of the injection unit. The molding unit may be secured in any desired angular position about the axis of the injection extrusion unit. In addition, the molding unit is also adjustable in a plane perpendicular to the horizontal axis of the injection unit and radially of such axis.

With the axis of the molding unit always being perpendicular to the axis of the injection unit, it is possible to produce molded members with an injection nozzle or feed head located in the mold division or parting plane and, owing to the angular adjustability of the molding unit about the axis of the injection unit between horizontal and vertical orientations, adjustability of the molding unit to any desired angular relation may be effected. Since the molding unit is adjustable radially of the axis of the injection unit, the mold can be moved so that its parting plane is radially outwardly of the axis of the injection unit so that, after an interchange of feeding heads, molded members may be formed with the feed or injection nozzle disposed centrally of the mold.

An advantage of the arrangement is that, with the injection unit always remaining positioned horizontally of the machine frame, there are no considerable weight displacements involved in movement of the molding unit. Also, the mounting of the control conduits and hydraulic conduits connected to the horizontally disposed injection unit is straightforward and simple. An additional advantage is that the axial positioning of the molding unit makes it unnecessary for this unit to be dismantled for a change in position.

It is therefore an object of the present invention to provide injection molding apparatus involving relatively adjustable injection and molding units in which dismantling of the parts is not necessary to provide for relative adjustment thereof.

A further object of the invention is to provide injection molding apparatus in which a molding unit is mounted for several degrees of freedom of adjustability relative to the axis of a horizontally disposed heating and injection unit.

Still a further object of the invention is to provide injection molding apparatus involving an injection unit and a molding unit, in which, without dismantling of the units, the molding unit can be arranged either for feeding of the material centrally to the mold or for feeding of the material in the parting plane of the mold.

For an understanding of the principles of the invention, reference is made to the following description of a typical embodiment thereof as illustrated in the accompanying drawings.

Figure 1:
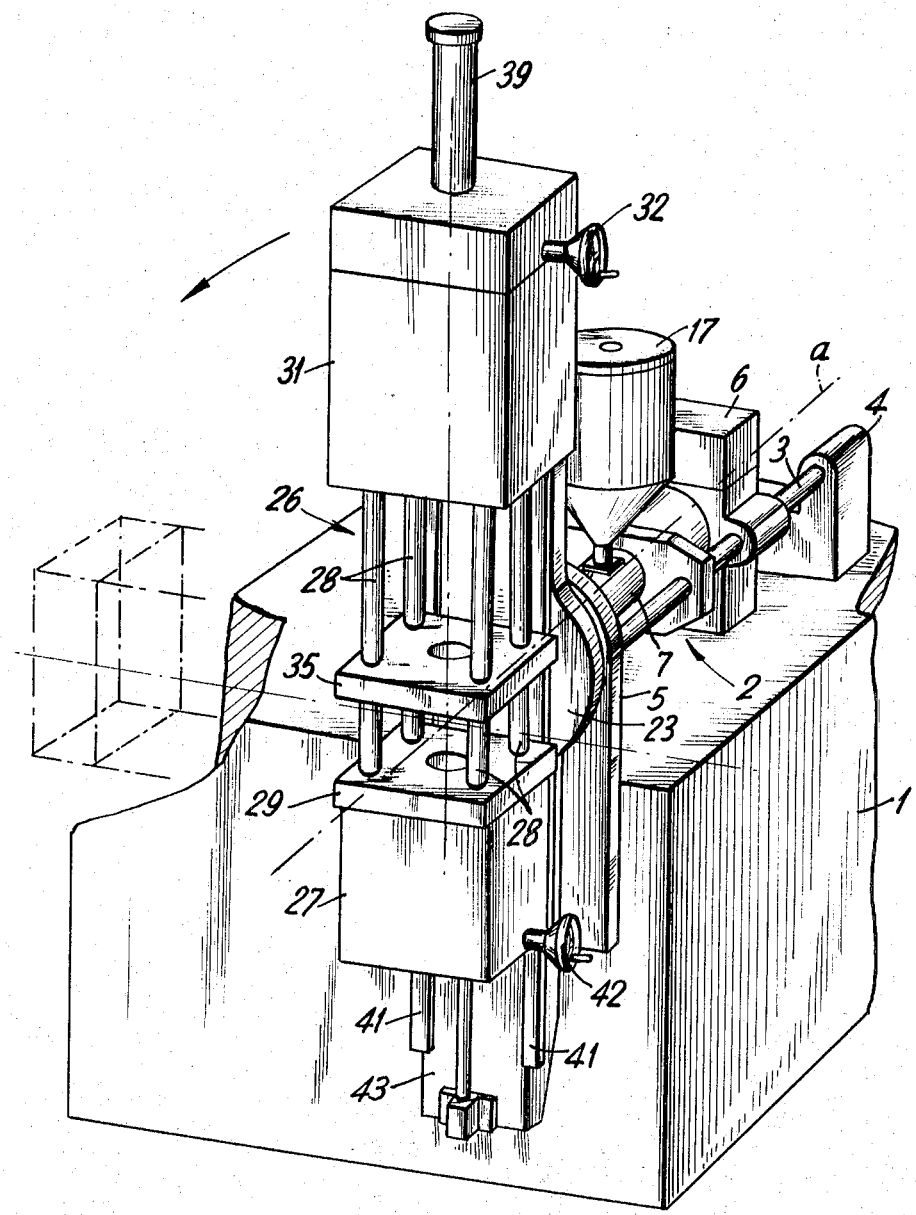
FIG. 1 is a somewhat diagrammatic and schematic perspective view of apparatus embodying the invention and with the molding unit in the upright position.
Figure 2:
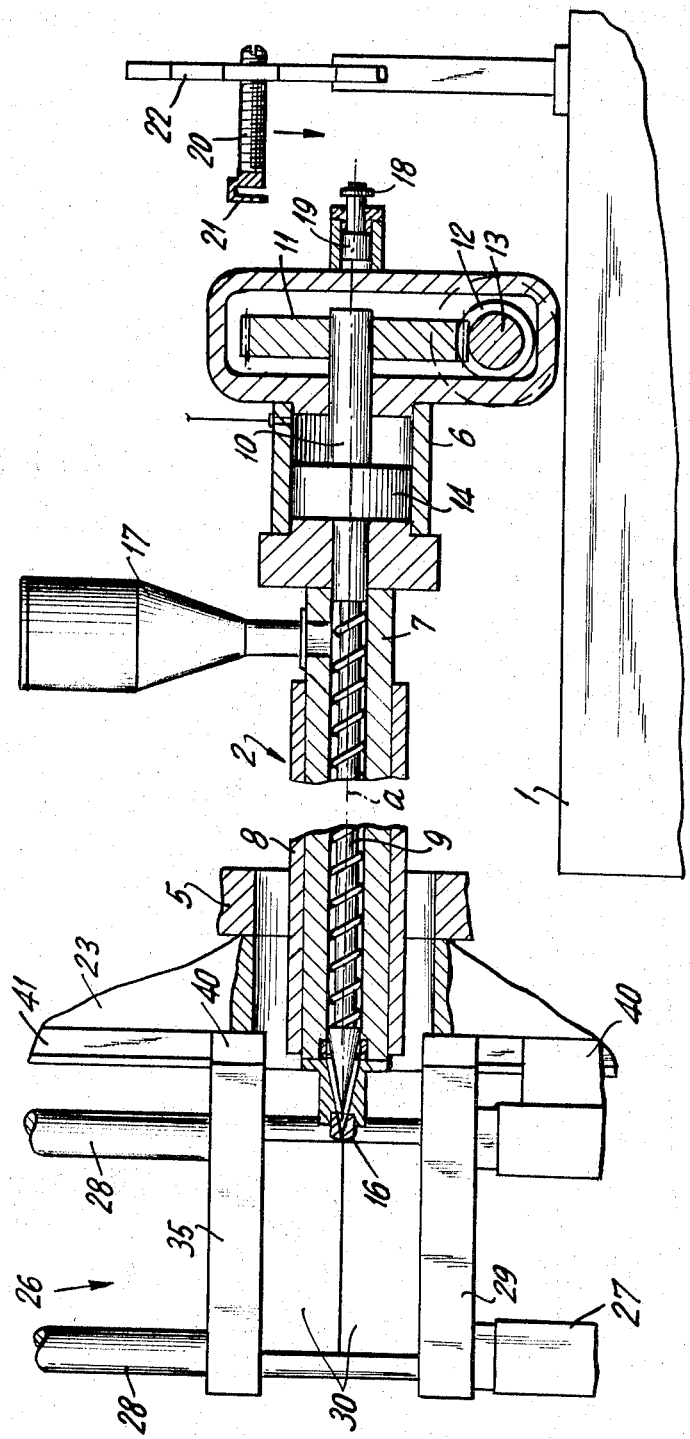
FIG. 2 is a partial side elevation view of the apparatus, illustrating the heating and injection unit in axial section.

Referring to the drawings in particular, FIG. 1 shows one form of apparatus embodying the invention including a somewhat diagrammatically illustrated machine frame 1 on which a heating and injection unit 2 is supported in horizontal orientation. Unit 2 is mounted for longitudinal adjustment, in a horizontal plane, on guide rods 3 supported in bearing blocks 4 and 5 on frame 1. This unit comprises a driving member 6 and a heating cylinder 7 which are aligned on a horizontal axis $a$. A feed screw 9 is arranged in cylinder 7, which latter is enclosed by a heating jacket 8, as best seen in FIG. 2. Screw 9 is rotatable by means of a splined shaft 10 which extends in axially adjustable relation through a gear 11 driven by a meshing gear 12 on a motor driven shaft 13.

On shaft 10 there is fixed a piston 14 reciprocable within a cylinder of driving member 6, and piston 14 is displaceable by a pressure medium to effect limited axial displacement of screw 9. An injection head 15, as best seen in FIG. 2, is provided with a nozzle 16 and is detachably secured to the front end of cylinder 7. A hopper 17 for the plastic materials to be extruded communicates with the rear end of cylinder 7.

For a purpose to be described, a catch 18 is positioned on the rear end of driving member 6 of unit 2, and this catch is secured to a piston 19 movable within a cylinder. A coupling link 21 is provided for cooperation with catch 18, and is mounted on a spindle 20 which is threaded through a bracket 22 for axial adjustment of spindle 20, and of catch 18, by rotation of spindle 20. Bracket 22 is supported for vertical adjustment on frame 1, so that coupling link 21 can be moved upwardly out of engagement with catch 18 or downwardly into engagement therewith.

On the bearing block 5, which is fixed on the forward portion of frame 1, there is mounted a support plate 23 which is carried by rollers 25 mounted on suitable pins, these rollers running in an annular groove 24 in bearing block 5 so that support plate 23 is angularly adjustable about the axis $a$ of unit 2. A spring biased locking pin 26' is reciprocably mounted in bearing block 5 and cooperates with mating recesses in support plate 23 so that the support plate can be releasably secured in any desired angular position relative to bearing block 5, the rollers 25 and locking pin 26' being best seen in FIG. 4. Molding unit 26 of the apparatus is mounted on support plate 23.

Unit 26 includes a bracket 27 in which are supported four parallel pillars 28 which are perpendicular to a common axial plane including axis $a'$ and are positioned at the four corners of a square. A plate 29 is fixed to bracket 27 and acts as a support for one-half of a two-part mold 30. A support block 31 is mounted on the other ends of pillars 28, and the position of support block 31 can be adjusted along pillars 28, to correspond to the size of mold being used, by means of a hand wheel 32 operating gearing means operatively associated with one or more of the pillars 28.

Links 33 are hinged, at one end, to the underside of support block 31. The other end of each link 33 is pivotally connected to one end of a respective lever 34, and the other ends of levers 34 are pivotally connected to a plate 35 which is adjustably displaceable along pillars 28. Plate 35 acts as a support for the other half of the extrusion mold 30. A respective short link or tongue 36 has one end pivotally connected to the pivotal interconnection of each pair of links and levers 33 and 34, and the other ends of tongues 34 are pivotally connected to a central member 37 secured on a piston rod 38 reciprocable through the block 31. As illustrated in FIG. 1, a hydraulic cylinder 39 may be provided for operating piston rod 38.

Figure 3:
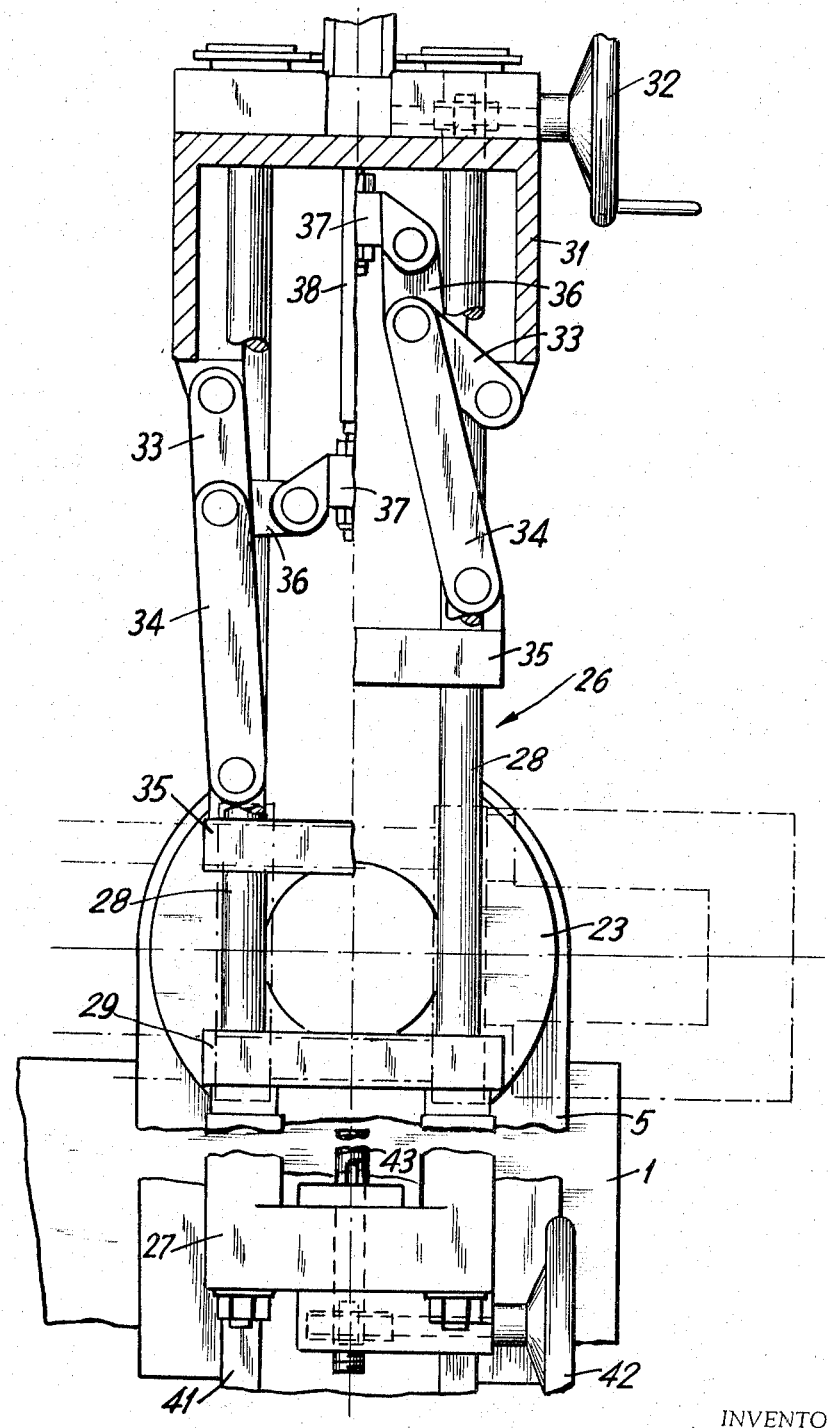
FIG. 3 is a front elevation view of the apparatus partly in section, and illustrating, on either side of a vertical center line, two different positions of the molding unit.

The described lever and link arrangement acts in the nature of a toggle mechanism for opening and shutting mold 30. Referring to FIG. 3, on the left side of this figure the mechanism is shown in the mold-closed position in which levers 34 and links 33 are extended in substantial alignment with each other, with the associated tongue 36 extending substantially perpendicular from the interconnection of each lever 34 and link 33. On the right-hand side of FIG. 3, the mechanism is shown in the mold-opened position. In this position, each lever 34 and link 33 forms an acute angle, while an associated tongue 36 extends nearly parallel to piston rod 38 which is in its retracted position.

In FIGS. 1, 2 and 3 molding unit 26 is shown in the vertical position. Moreover, in the position shown in FIGS. 1, 2 and 3, the molding unit is so arranged that axis $a$ of injection unit 2 is in the parting plane of closed mold 30. Thus, in this position of the molding unit, molded articles can be produced with the feed or injection head located at the mold parting plane. The vertical orientation of molding unit 26 furthermore provides for molded articles to be formed with deposits, for example of metal. Due to the fact that molding unit 26 is supported for angular adjustment about axis $a$, by means of mounting plate 23 on supporting block 5, unit 26, after disengagement of lock 26', may be angularly adjusted in a plane perpendicular to axis $a$. For example, it may be moved into the horizontal position shown, in FIGS. 1 and 3, in dotted lines, and then can be locked in this position. Furthermore, it is possible to adjust molding unit 26 radially of axis $a$.

For this latter purpose, the molding unit may be adjustably positioned and fixed by means of guide means or flanges 40 in bracket 27 and in the plates 29 and 35, these flanges adjustably engaging rail means or guide bars 41 on support plate 23. Adjustment is effected by means of the hand wheel 42 which, through suitable gearing, rotates a threaded spindle 43. This spindle is rotatably mounted in a foot of support plate 23, but is fixed against axial displacement. By operating hand wheel 42, unit 26 can be shifted longitudinally of rail means 41, for example into the position shown in FIG. 4.

Figure 4:
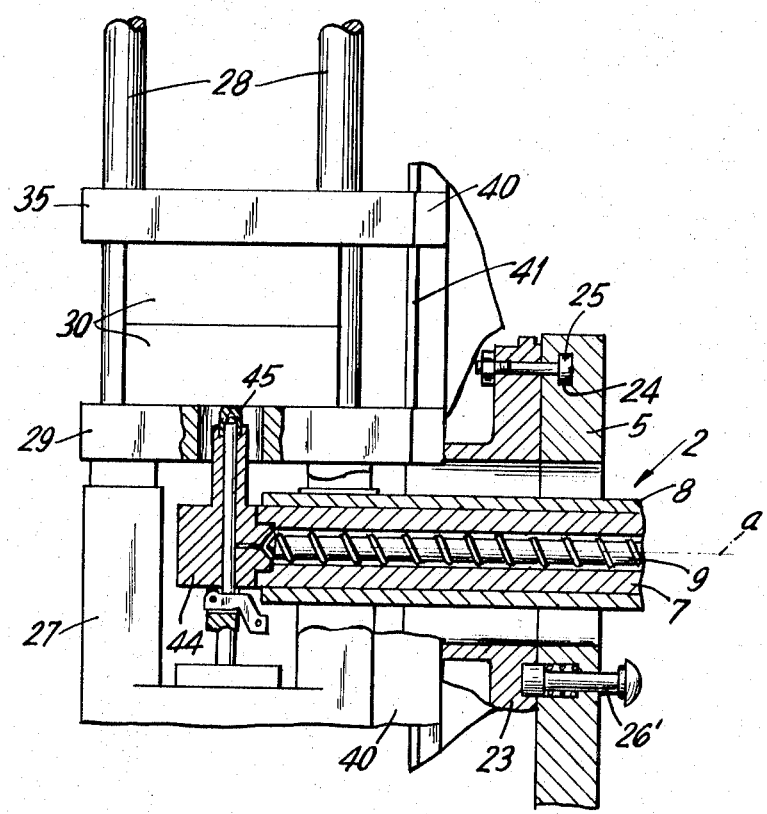
FIG. 4 is a side elevation view, partly in axial section through the injection unit, illustrating the mold shifted to displace its parting plane away from the axis of the injection unit.

In the position shown in FIG. 4, mold 30 has its parting plane displaced radially from axis $a$ of injection unit 2. Furthermore, the head 15 with the injection nozzle 16 can be removed and replaced by a reversing head 44 provided with an injection nozzle 45 disposed at the axis of unit 26 and connected to cylinder 7. Head 24 is supported on bracket 27. With the arrangement shown in FIG. 4, the molded members are produced by feeding the plastic materials with a feed head located centrally of mold 30. It will be understood that, in the position of FIG. 4, support plate 23, and thus molding unit 26, can be angularly adjusted to any position in a plane perpendicular to axis $a$, and locked in such position.

Unit 2 can be manually adjusted longitudinally of axis $a'$ by means of coupling 21. For this purpose, support 22 is lowered until coupling 21 engages catch 18, and then spindle 20 is rotated, by means of a screw driver or the like, to effect axial adjustment of unit 2. This manual adjustment of unit 2 makes possible good accessibility to the injection nozzle of feed head part of the unit, and furthermore simplifies construction of unit 2. It will be understood that, with coupling 21 engaged in catch 18, the unit 2 may also be adjusted axially of axis $a$ by hydraulic means, and can be locked in any desired direction or fixed position.

The described apparatus is simple in construction and operation and provides, by adjustment of molding unit 26, adaptation of the machine to all possible injection molding conditions. Furthermore, since molding unit 26 always extends perpendicularly to axis $a$ of injection unit 2, the machine can be provided with a second injection unit whereby to provide for injection molding of two different materials, or of two materials of different colors. This second unit can also be arranged to extend horizontally with respect to molding unit 26.

While a specific embodiment of the invention has been shown and described in deail to illustrate the application of the principles of the invention, it will be understood that the invention may be embodied otherwise without departing from such principles.

What is claimed is:

1. Injection molding apparatus comprising, in combination, a machine frame; a heating and injection unit supported on said frame and having a longitudinal axis; a molding unit operatively associated with said injection unit and having a longitudinal axis; means mounting said molding unit on said frame, independently of said injection unit, for adjustment, relative to said frame, in a plane perpendicular to the axis of said injection unit, longitudinally of its own axis, and angularly about the axis of said injection unit; said means further providing for adjustment of said molding unit radially of the axis of said injection unit.

2. Injection molding apparatus comprising, in combination, a machine frame; a heating and injection unit supported on said frame and having a horizontally extending longitudinal axis; a molding unit operatively associated with said injection unit and having a longitudinal axis; means mounting said molding unit on said frame, independently of said injection unit, for adjustment, relative to said frame, in a plane perpendicular to the horizontal axis of said injection unit, longitudinally of its own axis, and angularly of the axis about said injection unit; said means further providing for adjustment of said molding unit radially of the horizontal axis of said injection unit.

3. Injection molding apparatus comprising, in combination, a machine frame; a heating and injection unit supported on said frame and having a horizontally extending longitudinal axis, said heating and injection unit including a material feed head; a molding unit operatively associated with said injection unit and having a longitudinal axis, said molding unit being arranged for communication with said material feed head; a two-part mold included in said molding unit and having a parting plane; means mounting said molding unit on said frame, independently of said injection unit, for adjustment, relative to said frame, in a plane perpendicular to the axis of said injection unit; said means providing for adjustment of said molding unit radially of the axis of said injection unit between a first position, in which a feed head on said injection unit is in the parting plane of said mold and a second position, in which a feed head on said injection unit is disposed along the axis of said molding unit.

4. Injection molding apparatus comprising, in combination, a machine frame; a heating and injection unit supported on said frame and having a horizontally extending longitudinal axis, said heating and injection unit including a material feed head; a molding unit operatively associated with said injection unit and having a longitudinal axis, said molding unit being arranged for communication with said material feed head; a two-part mold included in said molding unit and having a parting plane; means mounting said molding unit on said frame, independently of said injection unit, for adjustment, relative to said frame, in a plane perpendicular to the axis of said injection unit; said means providing for adjustment of said molding unit radially of the axis of said injection unit between a first position, in which a feed head on said injection unit is in the parting plane of said mold and a second position, in which a feed head on said injection unit is disposed along the axis of said molding unit; said mounting means further providing for angular adjustment of said molding unit about the axis of said injection unit; and releasable means for securing said molding unit in angularly adjusted position.

5. Injection molding apparatus comprising, in combination, a machine frame; a heating and injection unit supported on said frame and having a horizontally extending longitudinal axis; means mounting said heating and injection unit for adjustment, relatively of said frame, parallel to its horizontal longitudinal axis; feed heads interchangeably connectable to said injection unit, one of said feed heads being arranged for extrustion of material axially of said injection unit and another of said feed heads being arranged for extrusion of material radially of said injection unit; a molding unit operatively associated with said injection unit and having a longitudinal axis; a two-part mold including in said molding unit and arranged for injection of material at its parting plane and also for injection of material along the axis of said molding unit; means mounting said molding unit on said frame, independently of said injection unit, for adjustment, relative to said frame, in a plane perpendicular to the axis of said injection unit; said mounting means providing for adjustment of said molding unit, radially of the axis of said adjusting unit, between a first position, in which said parting plane is coplanar with the axis of said injection unit, and a second position, in which said parting plane is displaced radially from the axis of said injection unit; whereby, said first position, said one feed head may communicate with said mold at the parting plane and, in said second position, said other feed head may communiacte with said mold at the axis of said molding unit; said means mounting said injection unit for longitudinal adjustment parallel to its axis providing for extension and retraction of said injection unit for alignment of said respective heads at their respective communicating positions with said mold.

6. Injection molding apparatus comprising in combination, a machine frame; a heating and injection unit supported on said frame and having a horizontally extending longitudinal axis; means mounting said heating and injection unit for adjustment, relatively of said frame, parallel to its horizontal longitudinal axis; feed heads interchangeably connectable to said injection unit, one of said feed heads being arranged for extrusion of material axially of said injection unit and another of said feed heads being arranged for extrusion of material radially of said injection unit; a molding unit operatively associated with said injection unit and having a longitudinal axis; a two-part mold included in said molding unit and arranged for injection of material at its parting plane and also for injection of material along the axis of said molding unit; means mounting said molding unit on said frame, independently of said injection unit, for adjustment, relative to said frame, in a plane perpendicular to the axis of said injection unit; said mounting means providing for adjustment of said molding unit, radially of the axis of said adjusting unit, between a first position, in which said parting plane is coplanar with the axis of said injection unit, and a second position, in which said parting plane is displaced radially from the axis of said injection unit; whereby, in said first position, said one feed head may communicate with said mold at the parting plane and, in said second position, said other feed head may communicate with said mold at the axis of said molding unit; said means mounting said injection unit for longitudinal adjustment parallel to its axis providing for extension and retraction of said injection unit for alignment of said respective heads at their respective communicating positions with said mold; and manually operable means selectively interconnectable with said injection unit and effective to adjust the same longitudinally parallel to its axis.

7. Injection molding apparatus comprising, in combination, a machine frame; a heating and injection unit having a longitudinal horizontal axis; support means, including a support block, mounting said heating and injection unit on said frame for adjustment longitudinally, relative to said frame, parallel to said horizontal axis; a support plate mounted on said support block for angular adjustment about said horizontal axis; a molding unit operatively associated with said injection unit and having a longitudinal axis; mounting means mounting said molding unit on said support plate, in a plane perpendicular to said horizontal axis of said injection unit; latch means operatively associated with said support block and support plate and effective to latch said support plate releasably in any selected angular position with respect to said support block; a two-part mold included in said molding unit and having a parting plane; and feeding head means operatively associated with said heating and injection unit and communicable with said mold selectively at said parting plane or at a location on the axis of said molding unit.

8. Injection molding apparatus comprising, in combination, a machine frame; a heating and injection unit having a longitudinal horizontal axis; support means, including a support block, mounting said heating and injection unit on said frame for adjustment longitudinally, relative to said frame, parallel to said horizontal axis; a support plate mounted on said support block for angular adjustment about said horizontal axis; a molding unit operatively associated with said injection unit and having a longitudinal axis; mounting means mounting said molding unit on said support plate, in a plane perpendicular to said horizontal axis of said injection unit; latch means operatively associated with said support block and support plate and effective to latch said support plate releasably in any selected angular position with respect to said support block; a two-part mold included in said molding unit and having a parting plane; and feeding head means operatively associated with said heating and injection unit and communicable with said mold selectively at said parting plane or at a location on the axis of said molding unit; said mounting means providing for adjustment of said molding unit, relative to said support plate, radially of said horizontal axis of said heating and injection unit.

9. Injection molding apparatus comprising, in combination, a machine frame; a heating and injection unit having a longitudinal horizontal axis; support means, including a support block, mounting said heating and injection unit on said frame for adjustment longitudinally, relative to said frame, parallel to said horizontal axis; a support plate mounted on said support block for angular adjustment about said horizontal axis; a molding unit operatively associated with said injection unit and having a longitudinal axis; mounting means mounting said molding unit on said support plate, in a plane perpendicular to said horizontal axis of said injection unit; latch means operatively associated with said support block and support plate and effective to latch said support plate releasably in any selected angular position with respect to said support block; a two-part mold included in said molding unit and having a parting plane; and feeding head means operatively associated with said heating and injection unit and communicable with said mold selectively at said parting plane or at a location on the axis of said molding unit; said mounting means including rectilinear rail means on said support plate and extending parallel to a radius through said horizontal axis of said injection unit; guide means on said molding unit; guide means on said molding unit engaged with said rail means for adjustable positioning longitudinally thereof; and adjusting means on said molding unit operatively engaged with said rail means for adjusting said molding unit along said rail means.

10. Injection molding apparatus comprising, in combination, a machine frame; a heating and injection unit supported on said frame and having a longitudinal axis; a molding unit operatively associated with said injection unit and having a longitudinal axis; means mounting said molding unit on said frame, independently of said injection unit, for adjustment, relative to said frame, in a plane perpendicular to the axis of said injection unit, longitudinally of its own axis, and angularly about the axis of said injection unit; said means further providing for adjustment of said molding unit radially of the axis of said injection unit; a feed cylinder included in said heating and injection unit; a feed hopper communicating with one end of said feed cylinder; a feed head at the opposite end of said feed cylinder and communicable with said molding unit; a feed screw rotatably mounted axially through said feed cylinder; means for rotating said screw to feed material from said hopper to said feed head; and means effective to adjust said feed screw axially of said feed cylinder.

11. Injection molding appartus comprising, in combination, a machine frame; a heating and injection unit supported on said frame and having a longitudinal axis; a molding unit operatively associated with said injection unit and having a longitudinal axis; means mounting said molding unit on said frame, independently of said injection unit, for adjustment, relative to said frame, in a plane perpendicular to the axis of said injection unit, longitudinally of its own axis, and angularly about the axis of said injection unit; said means further providing for adjustment of said molding unit radially of the axis of said injection unit; a two-part mold included in said molding unit; a first plate fixed in said mold included in said molding unit; a first plate fixed in said molding unit and supporting one-half of said mold; a second plate included in said molding unit and supporting the other half of said mold; means for moving said second plate relative to said first plate to open and close said mold; and adjustment mechanism associated with said last-named means to adjust the effective positions of said second plate to accommodate molds of different sizes.

12. Injection molding apparatus comprising, in combination, a machine frame; a heating and injection unit having a longitudinal horizontal axis; support means, including a support block, mounting said heating and injection unit on said frame for adjustment longitudinally, relative to said frame, parallel to said horizontal axis; a support plate mounted on said support block for angular adjustment about said horizontal axis; a molding unit operatively associated with said injection unit and having a longitudinal axis; mounting means mounting said molding unit on said support plate, in a plane perpendicular to said horizontal axis of said injection unit; latch means operatively associated with said support block and support plate and effective to latch said support plate releasably in any selected angular position with respect to said support block; a two-part mold included in said molding unit and having a parting plane; and feeding head means operatively associated with said heating and injection unit and communicable with said mold selectively at said parting plane or at a location on the axis of said molding unit; said mounting means including rectilinear rail means on said support plate and extending parallel to a radius through said horizontal axis of said injection unit; guide means on said molding unit engaged with said rail means for adjustable positioning longitudinally thereof; and adjusting means on said molding unit operatively engaged with said rail means for adjusting said molding unit along rail means; and manual adjustment means selectively engageable with said heating and injection unit and effective to adjust the same longitudinally of said frame parallel to said horizontal axis.

References Cited

UNITED STATES PATENTS

| 2,711,567 | 6/1955 | Knapp | 22—92 |
| 3,015,131 | 1/1962 | Hehl | 18—30 |
| 3,034,175 | 5/1962 | Hehl | 18—30 |
| 3,068,520 | 12/1962 | Hehl | 18—30 |

J. SPENCER OVERHOLSER, *Primary Examiner.*

WILBUR L. McBAY, *Examiner.*